United States Patent
Hyun

(10) Patent No.: US 8,957,998 B2
(45) Date of Patent: Feb. 17, 2015

(54) LENS SHADING CORRECTION APPARATUS AND METHOD IN AUTO FOCUS CAMERA MODULE

(75) Inventor: Jinwook Hyun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 679 days.

(21) Appl. No.: 12/967,766

(22) Filed: Dec. 14, 2010

(65) Prior Publication Data

US 2011/0141323 A1 Jun. 16, 2011

(30) Foreign Application Priority Data

Dec. 14, 2009 (KR) .................. 10-2009-0124185

(51) Int. Cl.
  *H04N 9/64* (2006.01)
  *H04N 5/357* (2011.01)
(52) U.S. Cl.
  CPC .................................. *H04N 5/3572* (2013.01)
  USPC ........................................................ 348/251
(58) Field of Classification Search
  CPC ............................ H04N 5/357; H04N 5/3572
  USPC .............. 348/222.1, 241, 251, 335, 345, 362,
                        348/369; 382/254, 274, 307
  See application file for complete search history.

(56) References Cited

U.S. PATENT DOCUMENTS

| | | | |
|---|---|---|---|
| 7,391,450 B2* | 6/2008 | Pinto et al. | 348/251 |
| 7,408,576 B2* | 8/2008 | Pinto et al. | 348/251 |
| 8,406,557 B2* | 3/2013 | Park et al. | 382/274 |
| 2006/0092291 A1* | 5/2006 | Bodie | 348/231.99 |
| 2008/0273812 A1* | 11/2008 | Fujita et al. | 382/274 |
| 2008/0291302 A1* | 11/2008 | Noh | 348/251 |
| 2008/0309772 A1* | 12/2008 | Ikeda | 348/208.7 |
| 2009/0067744 A1* | 3/2009 | Kawanishi et al. | 382/274 |
| 2009/0219419 A1* | 9/2009 | Kawasaka | 348/251 |

* cited by examiner

*Primary Examiner* — Aung S Moe
*Assistant Examiner* — Chriss Yoder, III
(74) *Attorney, Agent, or Firm* — Saliwanchik, Lloyd & Eisenschenk

(57) ABSTRACT

Provided is a lens shading correction method, the lens shading correction method including, obtaining optical axis coordinates and a center-contrasted surrounding gain according to a lens position of a predefined long-distance focusing and short-distance focusing to a sample image input in which each pixel has an uniform brightness value, obtaining image data using the auto focus function, obtaining a modified optic coordinate and center-contrasted surrounding gain according to a lens position used in the acquisition of the image data, and lens shading correcting the image data using the modified optic axis coordinate and center-contrasted surrounding gain.

17 Claims, 5 Drawing Sheets

Fixed lens shading correction after application

LONG-DISTANCE (infinity)   SHORT-DISTANCE (macro)

Fixed lens shading correction before application

LONG-DISTANCE (infinity)   SHORT-DISTANCE (macro)

Fixed lens shading correction after application

A

LONG-DISTANCE (infinity)   SHORT-DISTANCE (macro)

LENS SHADING CORRECTION APPARATUS AND METHOD IN AUTO FOCUS CAMERA MODULE

CROSS-REFERENCE TO RELATED APPLICATION

This application claims the benefit under 35 U.S.C. §119 of Korean Application No. 10-2009-0124185, filed on Dec. 14, 2009, which is hereby incorporated by reference in its entirety.

BACKGROUND OF THE DISCLOSURE

1. Field of the Invention

The present invention relates to a lens shading correction apparatus and method in an auto focus camera module.

2. Discussion of the Related Art

A camera module is mounted on products having various camera functions such as a portable terminal, a notebook computer, and a PDA (personal digital assistant), and to date the capacity of camera modules has so improved to as to be compared to a generally used digital camera.

Generally, an image photographed by an image photographing device has several kinds of information on a processing object corresponding to a subject, but a case frequently occurs that components of a luminance signal and a color signal corresponding to that image signal are concentrated and distorted owing to processing objects, performance of an imaging device or imaging conditions. Therefore, a camera module experiences compensations such as a lens shading correction, an auto exposure and an auto white and then proceeds on a capture of an image. A surrounding area of an image sensor in such a camera module does not receive sufficient light due to optic characteristics of a lens, and as a result of this attenuation of a signal is caused, which is called a lens shading. An attenuation of signals resulting from a lens shading varies from a position of pixels and colors. Therefore, an image signal processor (ISP) corrects an attenuation of signals in a surrounding area through an image processing procedure called a lens shading correction in a peripheral area to obtain a more improved image.

Same fixed lens shading correction is applied with mass-produced camera modules. A gain table for applying a lens shading correction is batchedly generated to be stored in a memory, and an image signal processor by using a gain table stored in the memory corrects a gain per each pixel to compensate a lens distortion. However, a camera module having an auto focus function has a problem in that a distortion variation of a lens shading compensation can occur while a lens is moving to focus on a subject.

BRIEF SUMMARY

The present invention provides a lens shading compensation apparatus and method with a minimized distortion variation of a lens shading correction occurring when a lens is moving to focus on a subject in a camera module with an auto focus function.

A lens shading correction method according to one embodiment of the present invention, in which an image sensor transforms an optic image inputted from a lens part containing a multiple of lenses into an imaging data being an electric signal and the image data is lens-shading corrected at an image signal processor using an auto focus function, includes: obtaining optical axis coordinates and a center-contrasted surrounding gain according to a lens position of a predefined long-distance focusing and short-distance focusing to a sample image input in which each pixel has an uniform brightness value; obtaining image data using the auto focus function; obtaining a modified optic coordinate and center-contrasted surrounding gain according to a lens position used in the acquisition of the image data; and lens shading correcting to the image data using the modified optic axis coordinate and center-contrasted surrounding gain.

A lens shading correction method according to the present embodiment solves a problem that a distortion variation of a lens shading correction can occur while a lens is moving to focus on a subject in a camera module bearing an auto focus function and thus minimizes a distortion variation according to a lens shading correction.

A lens shading compensation method according to another embodiment of the present invention includes obtaining an optic-axis coordinate and a center vs surrounding gain based on a lens position of a preset long-distance focusing and short-distance focusing; obtaining image data; obtaining a modified optic-axis coordinate and center vs surrounding gain based on a lens position used in obtaining the image data; and lens shading correcting to the image data using the modified optic axis coordinate and center-contrasted surrounding gain.

A lens shading compensation apparatus of the invention includes a lens unit comprised of a multiple of lenses performing an auto focus function; an image sensor unit inputted with light of a subject from the lens unit and converting it to image data, that is an electrical signal; an optic axis gain modification unit obtaining a modified optic-axis coordinate and center vs surrounding gain based on a lens position used in obtaining the image data converted from the image sensor unit; and an image signal processing unit lens shading correcting to the image data using the modified optic-axis coordinate and center vs surrounding gain.

DETAILED DESCRIPTION

Figure 1:
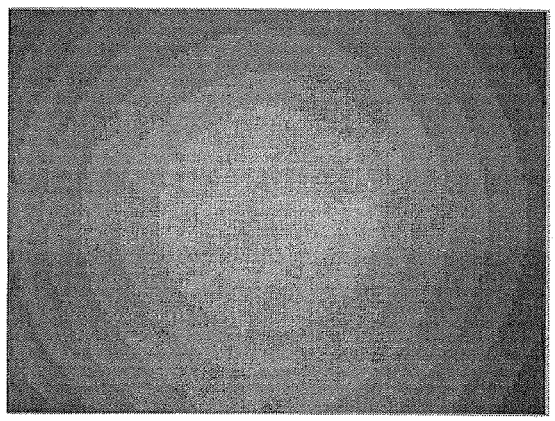
FIG. 1 is a diagram indicating a brightness status before a lens shading correction in a long-distance focusing and a short-distance focusing.
Figure 1:
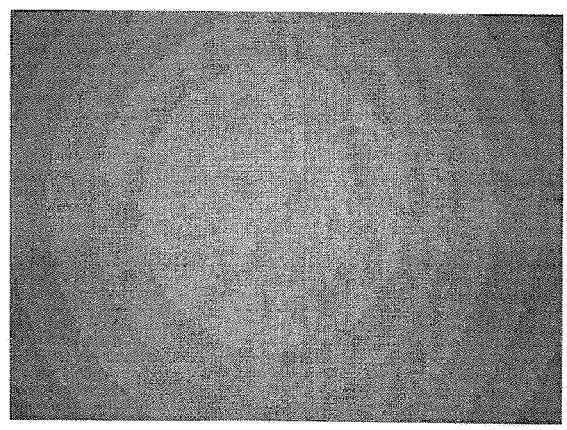
Figure 1:
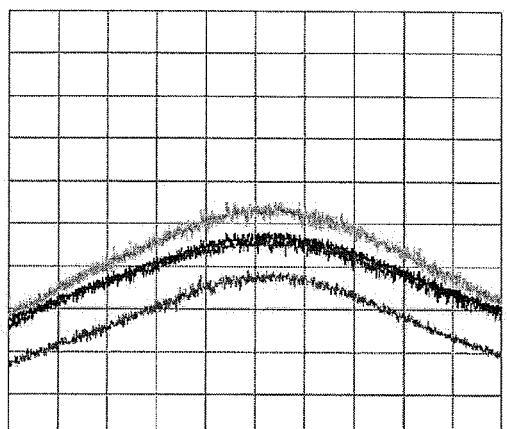
Figure 1:
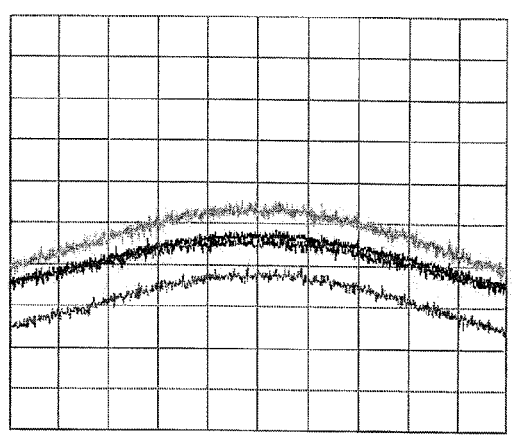

Since the present invention can be applied with various changes thereto and have several types of embodiments, specific embodiments intend to be exemplified in the drawings and minutely described in the detailed description. However, it does not limit the present invention to a specific example but should be appreciated to include all the changes, equivalents and replacements which fall in the spirit and technical scope of the present invention. Stated that any component is "connected" or "conjunctive" to another component, it will be appreciated to be directly connected or conjunctive to the very another component or otherwise that there exists any component in the midst of them.

In the following, the present invention will be described in detail referring to the attached drawings, but without regard to a drawing sign, an identical or corresponding component is assigned the same reference numeral and a redundant description regarding this will be omitted.

FIG. 1 is a diagram indicating a brightness status before a lens shading correction in a long-distance focusing and a short-distance focusing.

Referring to FIG. 1, before a lens shading correction, a distortion status occurs due to an optic characteristic of a lens and a state is shown that brightness of a central part of a lens and brightness of a surrounding part are inconsistent, and the distortion status is more significant in a long-distance focusing than in the case of a short-distance focusing.

Figure 2:
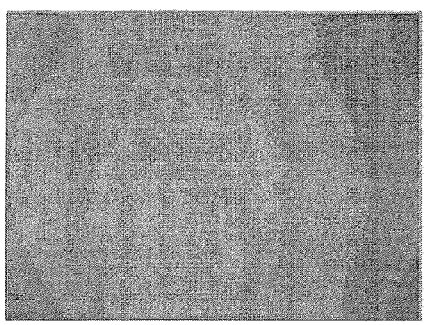
FIG. 2 is a diagram indicating a brightness status after a lens shading correction in a long-distance focusing and a short-distance focusing maximized by the long-distance focusing.
Figure 2:
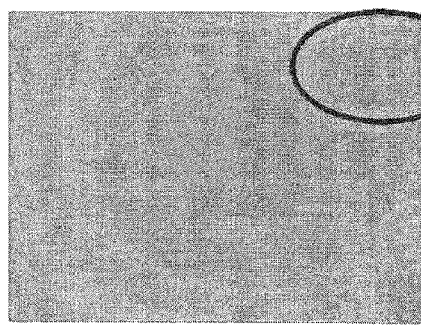
Figure 2:
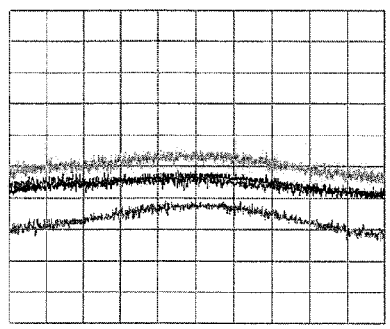
Figure 2:
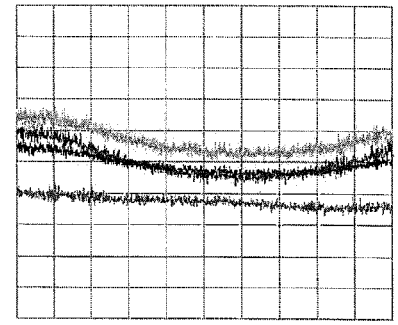

FIG. 2 is a diagram indicating a brightness status after a lens shading correction optimized using a long-distance focusing among the long-distance focusing and a short-distance focusing.

Referring to FIG. 2, a lens shading correction of compensating a gain according to a distance from a center of an image is done. After such a lens shading correction, brightness of a central part of a lens and brightness of a surrounding part shows a constant state, but in a case of using a great-distance optimized lens shading correction, when becoming a short-distance focusing, a surrounding area (See 'A' section) is over-corrected and thus a distortion occurs that a surrounding becomes brighter compared to a central part.

In a camera module having an auto focus function, an optical axis is shifted by a tilt occurring as a lens position moves from a long-distance focusing to a short-distance focusing. When a lens closes by to an image sensor with a long-distance focusing, and relatively in the case of a short-distance focusing a lens gets farther away from an image sensor, a surrounding optical amount changes and thus a center versus surrounding gain is altered.

Figure 3:
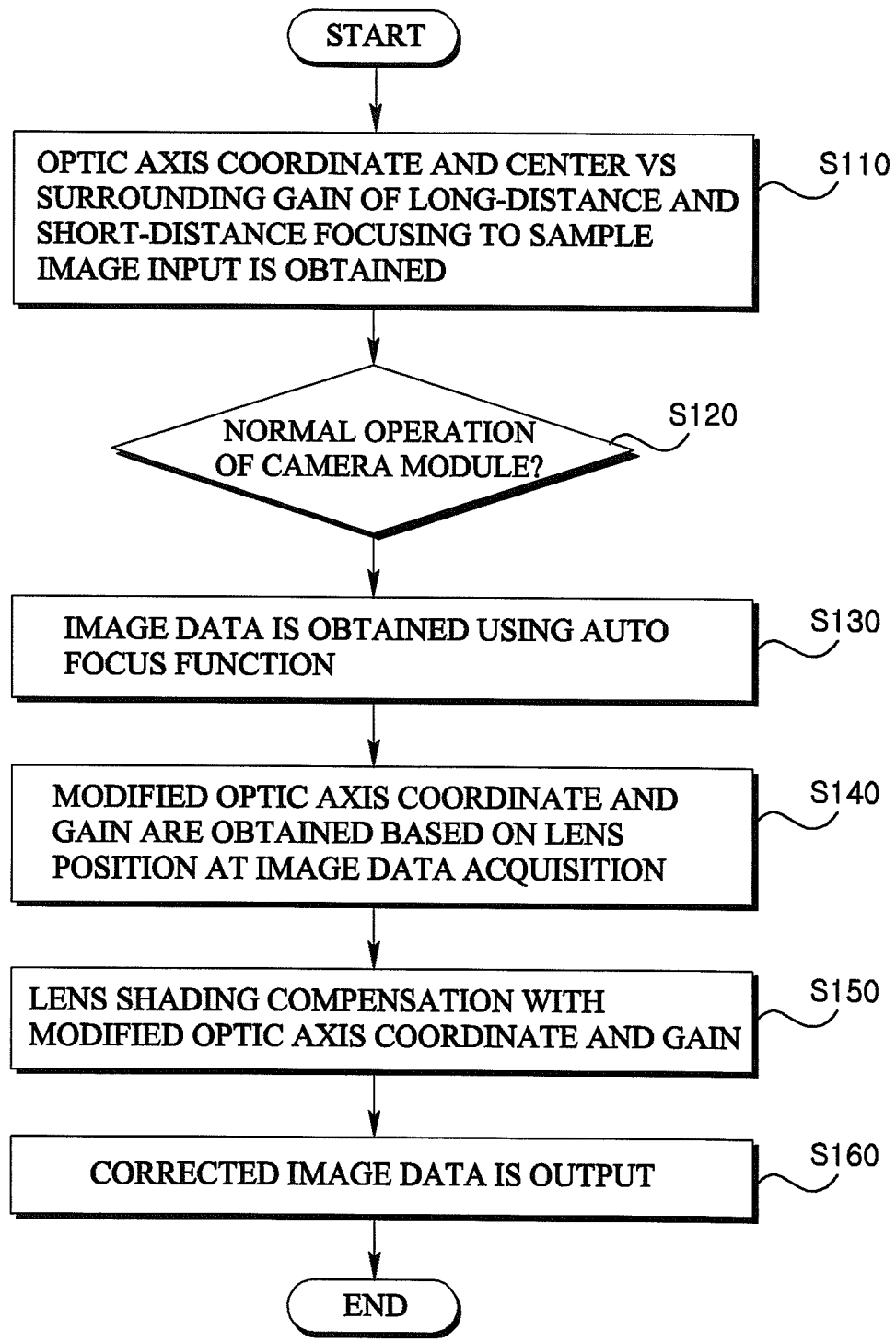
FIG. 3 is a flow diagram indicating a lens shading method according to the present invention.

FIG. 3 is a flow chart indicating a lens shading correction method according to the present embodiment.

Referring to FIG. 3, an optic axis coordinate and a center versus surrounding gain in the case of a long-distance focusing and a short-distance focusing relative to a sample image input in which each pixel has a uniform brightness value is obtained (S110). Herein, in the case of a long-distance focusing and a short-distance focusing, a lens position may be set at a camera module. For example, each of an optic axis coordinate and a center versus surrounding gain in the case of a great-distance focusing and an optic axis coordinate and a center versus surrounding gain in the case of a short-distance focusing may be obtained relative to a sample image input. Also, S110 will be enforced before an outdoor output of a manufactured camera module.

Figure 4:
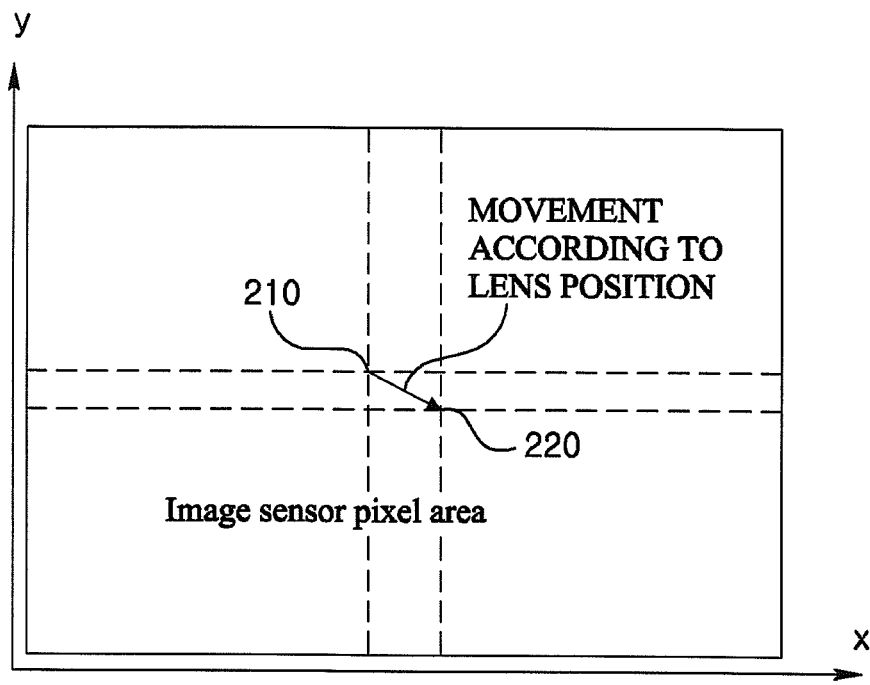
FIG. 4 is a diagram showing an optical axis in a case of being a long-distance focusing and a short-distance focusing.

FIG. 4 is a diagram of showing an optic axis movement in the case of a long-distance focusing and a short-distance focusing. Referring to FIG. 4, indicating an image sensor pixel seen from an x-axis and a y-axis, a long-distance focusing optical axis 210 turns into a short-distance optical axis 220 as a lens position changes.

Figure 5:
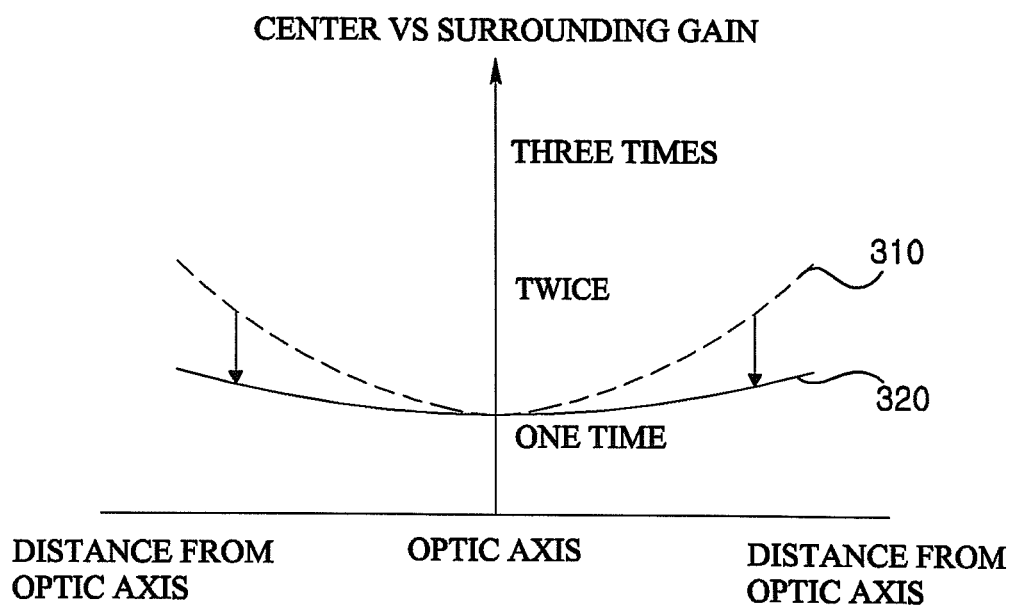
FIG. 5 is a diagram showing a center-contrasted surrounding gain in a case of being a long-distance focusing and a short-distance focusing.

FIG. 5 is a diagram of showing a center vs surrounding gain in a case of being a long-distance focusing and a short-distance focusing. Referring to FIG. 5, as a center versus surrounding gain value according to a distance from an optical axis which is centered on the optical axis, a center versus surrounding gain of a long-distance focusing 310 turns into a center versus surrounding gain of a short-distance focusing 320 as a lens position changes.

Referring to FIG. 3 again, if a camera module is normally operated (S120), by photographing a subject using an auto focus function image data is obtained (S130).

And the next, a modified optic axis coordinate and center versus surrounding gain according to a lens position in photographing a subject and obtaining an image data is obtained and stored (S140). The following Equations 1 and 2 describe an optical axis modified based on a lens position according to the present embodiment.

$$centerX(d) = \frac{(d - \min) \times (CX\max - CX\min)}{(\max - \min)} + CX\min \quad \text{Equation 1}$$

$$centerY(d) = \frac{(d - \min) \times (CY\max - CY\min)}{(\max - \min)} + CY\min \quad \text{Equation 2}$$

where, d is a lens position; min is a long-distance focusing lens position; max is a short-distance focusing lens position; CXmin is a long-distance focusing optic axis x coordinate; CYmin is a short-distance focusing optic axis y coordinate; CXmax is a short-distance focusing optic axis x coordinate; Cymax is a short-distance focusing optic axis y coordinate; centerX(d) is an optic axis x coordinate according to a lens position; and centerY(d) is an optic axis y coordinate according to a lens position. The following Equations 3 and 4 describes a modified center vs surrounding gain according to the present embodiment.

$$Gain(d) = \frac{(d - \min) \times (G\max - G\min)}{(\max - \min)} + G\min \quad \text{Equation 3}$$

where, d is a lens position; min is a long-distance focusing lens position; max is a short-distance focusing lens position; Gmin is a center versus surrounding gain of a long-distance focusing; Gmax is a center versus surrounding gain of a short-distance focusing; and Gain(d) is a center vs surrounding gain according to a lens position.

And the next, a lens shading correction process on an image data is performed at an image signal processor (ISP) using modified optic axis coordinates and center vs surrounding gains (S150). Next, an image data corrected through a lens shading compensation process is output (S150). A corrected image data may be output through a display.

Figure 6:
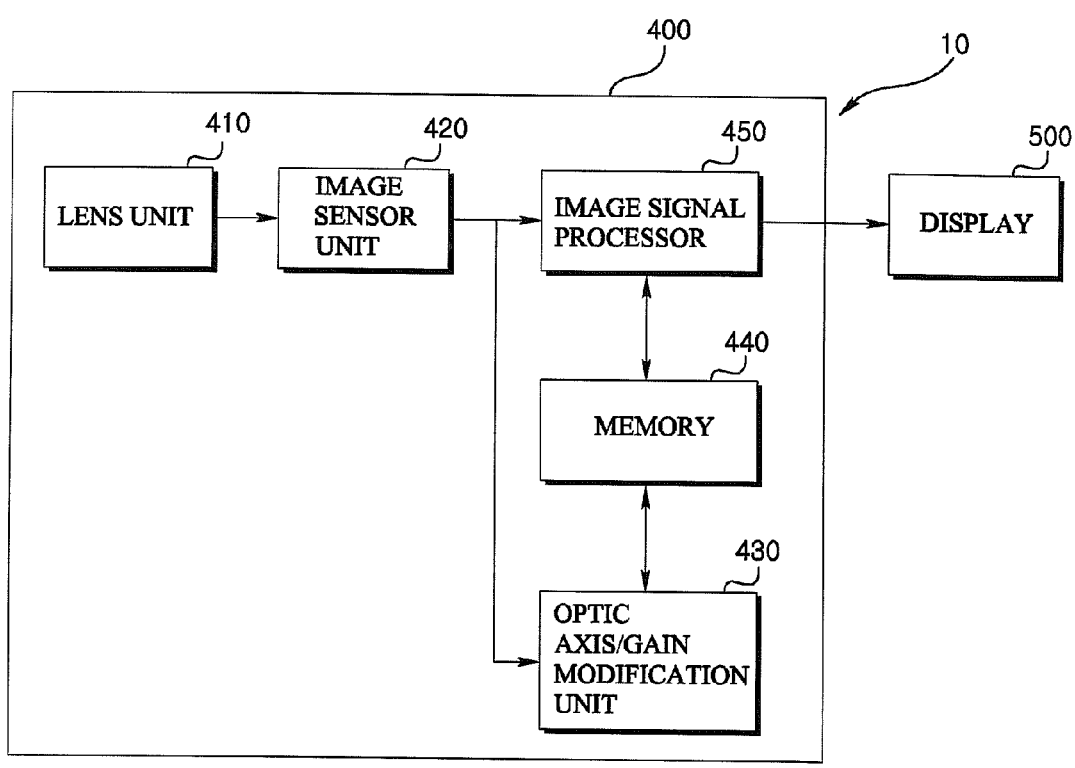
FIG. 6 is a block diagram indicating an image system containing a camera module of performing a lens shading correction according to the present embodiment.

FIG. 6 is a block diagram indicating an image system including a camera module conducting a lens shading correction according to the present embodiment.

Referring to FIG. 6, an imaging system 10 includes a camera module 400 and a display 500, and the camera module 400 includes a lens unit 410, an image sensor unit 420, an optic axis/gain modification unit 430, a memory 440, and an image signal processor 450, and may be called a lens shading compensation apparatus.

A lens unit 410, including a multiple of lenses, is inputted with an optic image of a subject. An image sensor unit 420 transforms an optic image inputted with a lens unit 410 into an original image data that is an electric signal, which then can be processed in an image system. Herein, an original image data means raw data, information recorded of only a change of an electric signal according to strength and weakness of light.

An optic/gain modification unit 430 obtains a modified optic axis coordinate and center vs surrounding gain based on a lens position in obtaining an image data photographing a subject at the lens unit 410 according to the present embodiment.

A memory 440 stores information on an optic axis coordinate and a centre vs surrounding gain and a long-distance lens position and a short-distance lens position in a case being a long-distance focusing and a short-distance focusing for a sample image input, and stores a modified optic axis coordinate and center vs surrounding gain obtained at the optic axis/gain modification unit 430 and a compressed image data coded, through an incoder, of image data processed at the image signal processor 450 described below.

The image signal processor 450 performs a lens shading correction process on an original image data input from the image sensor unit 420 based on a predefined standard using a modified optic axis coordinate and center vs surrounding gain stored in the memory 440 at a photographing time using an auto focus function. Besides that, the image signal processor 450 may process an adaptive color interpolation, a color correction, a Gamma control, a hue/gain control, an image effect, an auto exposure, an auto white balance and a backlight compensation.

The display 500 reads image data stored in the memory 440 and outputs it on a screen. The display 500 may be a liquid crystal device (LCD) or an organic light emitting device (OLED). Such an imaging system may be mounted on a portable telephone.

A term 'unit' used in the present embodiment means software or a hardware component such as FPGA (field-programmable gate array) or ASIC, and 'unit' performs any mission. However, 'unit' is not limited to software or hardware. 'Unit' may be configured to exist in an addressable storage medium and also may be configured to execute one or more processors. Therefore, as one example, 'unit' includes constituents such as software components, object-oriented software components, class components and task components, processes, functions, attributes, procedures, subroutines, segments in a program code, drivers, a firmware, a microcode, a circuit, data, a database, data structures, tables, arrays, and variables. Components and a function provided in 'unit(s)' can be coupled to a smaller number of components and 'unit(s)' or more divided to further components and 'unit(s)'. In addition, components and 'unit(s)' may be implemented to execute one or more CPUs in a device or a secure multimedia card.

Described overall functions may be performed by processors such as a microprocessor, a controller, a microcontroller, ASIC (Application Specific Integrated Circuit) according to software or a program code coded to carry out the described function. The design, development and implementation would be obvious to those skilled in the art on the basis of the description of the present invention.

While the present invention has been described in detail hereinabove through embodiments, those skilled in the art would understand that various modifications can be made in the present invention without departing from the spirit and scope of the present invention. Therefore, the scope of the present invention should not be restricted to the described embodiment, but would encompass all embodiments that fall in the accompanying claims.

What is claimed is:

1. A lens shading correction method, the method comprising:
   determining a first optical center coordinate at an image sensor and a first gain corresponding to a first position of a lens, and a second optical center coordinate at the image sensor and a second gain corresponding to a second position of the lens related to a sample image in which each pixel has a uniform brightness, the first position including a long-distance focusing position and the second position including a short-distance focusing position;
   obtaining an image by the image sensor;
   determining a third position of the lens when the image is obtained;
   determining a third optical center coordinate at the image sensor and a third gain corresponding to the third position of the lens; and
   compensating the image by the third optical center coordinate and the third gain;
   wherein the third optical center coordinate is determined by the first and second optical center coordinates and the third gain is determined by the first and second gains; and
   wherein the third optical center coordinate at the image sensor is determined based on the coordinates of the first and second optical centers in relation to the first, second, and third lens positions.

2. The method of claim 1, wherein an x-coordinate of the third optical center coordinate is determined by following equation:

$$centerX(d) = \frac{(d - \min) \times (CX\max - CX\min)}{(\max - \min)} + CX\min,$$

where d is the third position of the lens; min is the first position of the lens; max is the second position of the lens; CXmin is an x-coordinate of the first optical center coordinate; CXmax is an x-coordinate of the second optical center coordinate; and centerX(d) is the x-coordinate of the third optical center coordinate.

3. The method of claim 1, wherein a y-coordinate of the third optical center coordinate is determined by following equation:

$$centerY(d) = \frac{(d - \min) \times (CY\max - CY\min)}{(\max - \min)} + CY\min,$$

where d is the third position of the lens; min is the first position of the lens; max is the second position of the lens; CYmin is a y-coordinate of the first optical center coordinate; CYmax is an x-coordinate of the second optical center coordinate; and centerY(d) is the y-coordinate of the third optical center coordinate.

4. The method of claim 1, wherein the third gain is determined by following equation:

$$Gain(d) = \frac{(d - \min) \times (G\max - G\min)}{(\max - \min)} + G\min,$$

where d is the third position of the lens; min is the first position of the lens; max is the second position of the lens; Gmin is the first gain; Gmax is the second gain; and Gain(d) is the third gain.

5. A lens shading compensation method, the method comprising:
   determining a first optical center coordinate at an image sensor and a first gain corresponding to a first position of a lens, and a second optical center coordinate at the image sensor and a second gain corresponding to a second position of the lens, the first position including a long-distance focusing position and the second position including a short-distance focusing position;
obtaining an image by the image sensor;
determining a third position of the lens when the image is obtained;
determining a third optical center coordinate at the image sensor and a third gain corresponding to the third position of the lens; and
compensating the image by the third optical center coordinate and the third gain;
wherein the third optical center coordinate is determined by the first and second optical center coordinates and the third gain is determined by the first and second gains; and
wherein the third position optical center coordinate at the image sensor is determined based on the coordinates of the first and second optical centers in relation to the first, second, and third lens positions.

6. The method of claim 5, wherein the obtaining an image by the image sensor includes obtaining the image by the image sensor and by the lens using an auto focus function.

7. The method of claim 5, wherein the first and second optical center coordinates and the first and the second gains are related to a standard image where each pixel has a uniform brightness.

8. The method of claim 5, wherein an x-coordinate of the third optical center coordinate is determined by following equation:

$$centerX(d) = \frac{(d - \min) \times (CX\max - CX\min)}{(\max - \min)} + CX\min,$$

where d is the third position of the lens; min is the first position of the lens; max is the second position of the lens; CXmin is an x-coordinate of the first optical center coordinate; CXmax is an x-coordinate of the second optical center coordinate; and centerX(d) is the x-coordinate of the third optical center coordinate.

9. The method of claim 5, wherein a y-coordinate of the third optical center coordinate is determined by following equation:

$$centerY(d) = \frac{(d - \min) \times (CY\max - CY\min)}{(\max - \min)} + CY\min,$$

where d is the third position of the lens; min is the first position of the lens; max is the second position of the lens; CYmin is a y-coordinate of the first optical center coordinate; CYmax is an x-coordinate of the second optical center coordinate; and centerY(d) is the y-coordinate of the third optical center coordinate.

10. The method of claim 5, wherein the third gain is determined by following equation:

$$Gain(d) = \frac{(d - \min) \times (G\max - G\min)}{(\max - \min)} + G\min,$$

where d is the third position of the lens; min is the first position of the lens; max is the second position of the lens; Gmin is the first gain; Gmax is the second gain; and Gain(d) is the third gain.

11. A lens shading compensation apparatus, comprising:
a lens unit configured to perform an auto focusing, the lens unit comprising a plurality of lenses;
an image sensor configured to convert an optical signal from the lens unit to an image;
a memory configured to store a first optical center coordinate at the image sensor and a first gain corresponding to a first position of the lens unit, and a second optical center coordinate at the image sensor and a second gain corresponding to a second position of the lens related to a sample image in which each pixel has a uniform brightness, the first position including a long-distance focusing position and the second position including a short-distance focusing position;
a modification unit configured to:
determine a third position of the lens unit when the image is obtained, and
determine a third optical center coordinate at the image sensor and a third gain corresponding to the first position of the lens unit; and
a processing unit configured to compensate the image by the third optical center coordinate and the third gain;
wherein the modification unit is further configured to determine the third optical center coordinate by the first and second optical center coordinates and determine the third gain by the first and second gains; and
wherein the modification unit is further configured to determine the third optical center coordinate at the image sensor based on the coordinates of the first and second third optical centers in relation to the first, second, and third lens positions.

12. The apparatus of claim 11, further comprising:
a display unit configured to display a compensated image.

13. The apparatus of claim 12, wherein the display includes a liquid crystal display (LCD) or an organic light emitting device (OLED).

14. The apparatus of claim 11, wherein the apparatus is equipped in a portable phone.

15. The apparatus of claim 11, wherein an x-coordinate of the third optical center coordinate is determined by following equation:

$$centerX(d) = \frac{(d - \min) \times (CX\max - CX\min)}{(\max - \min)} + CX\min,$$

where d is the third position of the lens unit; min is the first position of the lens unit; max is the second position of the lens unit; CXmin is an x-coordinate of the first optical center coordinate; CXmax is an x-coordinate of the second optical center coordinate; and centerX(d) is the x-coordinate of the third optical center coordinate.

16. The apparatus of claim 11, wherein a y-coordinate of the third optical center coordinate is determined by following equation:

$$centerY(d) = \frac{(d - \min) \times (CY\max - CY\min)}{(\max - \min)} + CY\min,$$

where d is the third position of the lens unit; min is the first position of the lens unit; max is the second position of the lens unit; CYmin is a y-coordinate of the first optical center coordinate; CYmax is an x-coordinate of the second optical center coordinate; and centerY(d) is the y-coordinate of the third optical center coordinate.

17. The apparatus of claim 11, wherein the third gain is determined by following equation:

$$\text{Gain}(d) = \frac{(d - \min) \times (G\max - G\min)}{(\max - \min)} + G\min,$$

where d is the third position of the lens unit; min is the first position of the lens unit; max is the second position of the lens unit; Gmin is the first gain; Gmax is the second gain; and Gain(d) is the third gain.

\* \* \* \* \*